3,300,512
  SYNTHESIS OF METAL-CONTAINING
           PHTHALOCYANINES
Herman Gerson, New York, N.Y., and William E. Bachman, North Haledon, N.J., assignors to Allied Chemical Corporation, New York, N.Y., a corporation of New York
No Drawing. Filed Aug. 12, 1965, Ser. No. 479,341
         13 Claims. (Cl. 260—314.5)

This application is a continuation-in-part of our application Serial No. 394,598 filed September 4, 1964.

This invention relates to improvements in the synthesis of metal-containing phthalocyanines. More particularly, it relates to improvements in the synthesis of unhalogenated and halogenated metal-containing phthalocyanines, and especially copper phthalocyanines, whereby greater yields of products and products of better quality are obtained than are obtained by prior art procedures.

Metal phthalocyanines and their halogenated derivatives are valuable organic pigments noted for their clarity of shade and fastness properties.

Various processes have been proposed for their synthesis. One which has found favor is the so-called urea (or Wyler or Wyler-Riley) process, which is generally carried out by heating at temperatures within the range of about 170° to about 215° C. (1) a phthalocyanine intermediate, such as a phthalic acid compound (for example, phthalic acid or a salt thereof; e.g., an alkali metal or ammonium salt or a salt of the particular metal to be fixed in the phthalocyanine molecule, or an ester thereof or phthalic anhydride), a phthalodiamide, a phthalimide, or mixtures of two or more of the said intermediates; (2) a metal donor, such as the free metal, the oxides of the metal, the inorganic salts (e.g. chlorides, bromides, nitrates, phosphates, borates, sulfates, etc. of the metal), the organic salts (such as the oxalates, succinates or phthalates) of the metal, or mixtures of such metal donors; (3) a nitrogen donor, such as urea or a derivative thereof (e.g. "biuret, guanidine, guanidyl-urea, dicyandiamide or cyanuric acid) or mixtures thereof; (4) a catalyst which promotes the formation of metal phthalocyanines, such as ammonium molybdate or other compound containing a metal of Group IV, V or VI of the periodic system having an atomic number of from 22 to 92, inclusive, as well as mixtures of such catalysts, including, for example, ammonium borotungstate, ammonium phosphomolybdate, and phosphotungstomolybdic acid; and (5) an inert high boiling organic solvent, such as nitrobenzene, trichlorobenzene, o-dichlorobenzene, kerosene, naphthalene and mixtures of such solvents. Further descriptions of this general procedure will be found in U.S. Patents 2,197,458; 2,214,477; 2,410,301; 2,647,128 and 2,673,854, the disclosures of which are herein incorporated by reference.

When the urea process is employed for the preparation of metal phthalocyanines from alkali metal acid phthalates (monoalkali metal salts of phthalic acids) as starting materials, only low yields of metal phthalocyanines of inferior quality are obtained, and the metal phthalocyanines are obtained in a form generally unsuitable for pigmentary use. While they can be conditioned for such use by the well known techniques, such as acid-pasting, salt grinding, sand grinding, etc., the yields obtained are low and the products require extensive conditioning and purification to convert them into pigments of commercially acceptable quality.

The halogenated metal phthalocyanines, particularly the chlorine and bromine derivatives, are prepared, in the main, by two types of processes.

One, which is used primarily for the preparation of highly halogenated pigments (containing, for example, 14 or more atoms of halogen per molecule), involves direct halogenation of the corresponding halogen-free metal phthalocyanine. This process has the disadvantages of being a multistep process and of being difficult to control with respect to the extent of halogenation and the orientation of the halogen atoms introduced, when used for lower halogenated metal phthalocyanines.

The other, used principally for the preparation of pigments of relatively low halogen content (for example, 4 or less atoms of halogen), involves the utilization of a halogenated phthalic acid or salt or other phthalocyanine intermediate containing halogen as a nuclear-substituent (all of which will be referred to hereinafter, including the claims, as "a halogenated phthalocyanine intermediate") in a procedure such as that of the urea process.

When said process is employed for the synthesis of halogenated metal-containing phthalocyanines by a procedure involving heating together a halogenated phthalocyanine intermediate and especially a halogenated alkali metal acid phthalate, a metal donor, a nitrogen donor, a catalyst and optionally a high boiling non-reactive solvent, the resultant halogenated metal-containing phthalocyanines also are obtained in a form generally unsuitable for pigmentary use, the yields are low, and the products are often of poor quality, requiring extensive conditioning and purification to convert them into pigments of commercially acceptable quality. Furthermore, as the halogen content of the starting halogenated alkali metal acid phthalate increases, the yield of halogenated metal-containing phthalocyanine obtained decreases. Although increasing the reaction temperature has been found to minimize this yield loss somewhat, it has been also found that dehalogenation occurs in the case of the more highly halogenated intermediates.

It is therefore a principal object of this invention to provide an improved method of synthesizing metal-containing phthalocyanines.

A further object is to provide improvements in the preparation of metal phthalocyanines by the urea process from mono-alkali metal salts of o-phthalic acids.

Another object is to provide a process for the preparation of halogenated metal-containing phthalocyanines in improved yields.

More specific objects are to provide an improved process for the preparation of copper phthalocyanines and chlorinated copper phthalocyanines by a modification of the urea procedure.

Other objects and advantages of this invention will be apparent from the following description.

In accordance with the present invention, metal-containing phthalocyanines are synthesized by a modification of the urea process, and particularly in connection with the use of mono-alkali metal salts of o-phthalic acids (including halogenated phthalic acids) as starting materials, which involves carrying out the process with a reaction mixture which includes sulfur trioxide in an amount at least sufficient to improve the yield of metal phthalocyanine.

We have discovered that the inclusion of sulfur trioxide (as such or in a combined form), particularly in amounts corresponding to at least one-half mol, and preferably two-thirds to one and a quarter mols, per mol of phthalocyanine intermediate, in the conventional reaction mixtures comprising a phthalocyanine intermediate (especially a mono-alkali metal o-phthalate), a nitrogen donor, a metal donor, a catalyst and a solvent, results surprisingly in yields of metal-containing phthalocyanines which are considerably greater than those obtained when the same reaction is carried out in the absence of sulfur trioxide. Moreover, we have discovered that the quality of the resulting metal phthalocyanines also is usually improved, and that said improvements are especially marked in the case of unhalogenated metal phthalocyanines, as well as in the case of the halogenated metal phthalocyanines containing four or fewer atoms of halogen, and particularly chloro copper phthalocyanines.

In carrying out the improved process of the present invention, the sulfur trioxide may be employed in various forms. Thus, it can be incorporated into the reaction mixture as such, more particularly as liquid sulfur trioxide or as stabilized forms of liquid sulfur trioxide (e.g. "Sulfan"), or in the form of its combination with water (that is, the mono-hydrate or 100% sulfuric acid) or with hydrogen chloride (that is, chlorosulfonic acid) or with sulfuric acid (that is, fuming sulfuric acid or oleum).

As is known, oleum is available in various strengths, being essentially a solution of sulfur trioxide in 100% sulfuric acid. For example, 20%, 40% and 65% oleum are available commercially and represent solutions containing 20% $SO_3$ and 80% $H_2SO_4$, 40% $SO_3$ and 60% $H_2SO_4$ and 65% $SO_3$ and 35% $H_2SO_4$, respectively (by weight). For use in the practice of this invention, we prefer oleum of about 40% or greater strength and especially 65% oleum.

The amount of sulfur trioxide employed in our improved process can be varied over a considerable range. In general, an amount corresponding to at least one-half mol and preferably from about two-thirds to about one and a quarter mols of sulfur trioxide per mol of phthalocyanine intermediate is used. Larger amounts, for example, amounts corresponding to 2 mols or more of sulfur trioxide can be used; but such amounts give little or no yield improvement over the preferred amount and too large amounts tend to increase the possibility of undesirable sulfonation of the phthalocyanine intermediates.

While the advantages of the invention are obtained to a greater degree in connection with the use of alkali metal acid phthalates (mono-alkali metal salts of o-phthalic acid), whether in the unsubstituted form or containing halogen substituents, as starting materials in the urea process for making metal phthalocyanines, the invention is not limited to their use as starting materials; inasmuch as appreciable improvements in yield and quality result from the inclusion of sulfur trioxide in the reaction mixture in said synthesis of metal phthalocyanines, including halogenated metal-containing phthalocyanines, from other phthalocyanine intermediates.

The following are illustrative of phthalocyanine intermediates which are suitable for use in the manufacture of metal phthalocyanines by the improved procedure of the present invention (it being understood that where phthalic acid or derivatives thereof are referred to herein, orthophthalic acid or its derivatives are intended):

Sodium acid phthalate (monosodium phthalate)
Potassium acid phthalate
Ammonium acid phthalate
Phthalic anhydride
Phthalic diamide
Phthalimide
Monosodium-4-chlorophthalate
Monoammonium-3-bromophthalate
3,6-dichlorophthalic diamide
4-chlorophthalimide
3-chlorophthalic anhydride
4-chlorophthalic anhydride
3,5-dichlorophthalic anhydride
4-bromophthalic anhydride
3-bromo-6-chlorophthalic anhydride
3,4,6-trichlorophthalic anhydride
3,4,5,6-tetrachlorophthalic anhydride Mixtures of the above phthalocyanine intermediates with each other and/or with other phthalocyanine intermediates also can be employed as starting materials for the improved process. In those instances where a mixture of an alkali metal acid phthalate (unhalogenated or halogenated) with another phthalocyanine intermediate is used, we have found that the degree of improvement will vary, especially in the yield, depending on the relative proportion of the alkali metal acid phthalate in the mixture, being greater when the proportion of alkali metal acid phthalate is greater.

The amounts of the other reactants used to form the reaction mass can be varied over a wide range, in accordance with the known art of preparing phthalocyanines. For example, based on the amount of phthalocyanine intermediate present in the reaction mass:

(a) The amount of urea or other nitrogen donor can be varied from 1 to 15 or more times by weight.

(b) The amount of metal donor can be from about 110% to about 200% atomic equivalent weight.

(c) The amount of catalyst can be the usually relatively small catalytic quantity, of the order of from 0.1% to 10% of the phthalocyanine intermediate, by weight.

(d) The amount of solvent is generally at least that amount which provides a stirrable reaction mass. Larger proportions can and usually are used; but excessive amounts are obviously wasteful, increase the heating requirements of the process, and increase the difficulty and expense of removal and recovery of this optional component.

The urea process is conventionally carried out at elevated temperatures, i.e. above about 150° C. and as high as 240° C. in some instances, but generally within the range of about 170° to about 215° C. The optimum temperature will usually depend upon the specific metal phthalocyanine being produced. Thus, the more highly halogenated products will generally best be formed at higher temperatures than those of lesser halogen content, as indicated above. In most instances we prefer to operate our improved procedure within the temperature range of about 180° to about 210° C.

The improvement in yield obtained by the process of our invention is most striking in the preparation of copper phthalocyanines. Known methods for the synthesis of this class of substances from alkali metal acid phthalates are characterized by only moderate yields, of the order of 40% to 80%, and the quality of the products is generally poor. By the present invention, yields of 90% or better of copper phthalocyanines of good to excellent quality have been obtained. The benefits of this invention also may be obtained, however, in the synthesis of metal phthalocyanines from other intermediates and wherein the metal is other than copper. Typical of such other metals are, nickel, cobalt, iron and zinc.

In carrying out the invention in accordance with a preferred mode of procedure, a mixture of an amount by weight equivalent to about 1 mol of phthalocyanine intermediate (e.g., monopotassium phthalate or monosodium chlorophthalate) and an amount by weight of 65% oleum or stabilized liquid sulfur trioxide (e.g., "Sulfan") containing a weight of sulfur trioxide equivalent to about 0.8 mol of sulfur trioxide, or an equivalent molar quantity of $H_2SO_4$ or chlorosulfonic acid, is agitated in about 900 parts by weight of trichlorobenzene for about 2 hours. Then, after the addition of amounts by weight equivalent to about 6 mols of urea, a third of a mol of cuprous chloride, and 0.002 to 0.0025 mol of ammonium molybdate, the mixture is heated slowly to 195° C. and maintained at 195° to 200° C. for about 6 hours. The mixture is cooled and filtered. The filter cake is dried in vacuo to remove solvent and then is ground to a powder, which is then purified by alkaline and acid extractions in the following manner. The powder is slurried in about 1500 parts of water containing about 50 parts of sodium hydroxide, and the slurry is boiled for about 2 hours, then filtered and washed with hot water. This procedure is repeated using acidified water for the extraction. Thereafter, the acid-free crude product is dried to obtain the copper phthalocyanine product in yields of 90% or better. It can be readily conditioned by the known methods (acid-pasting, sand-grinding, etc.) to convert it to desirable pigmentary form.

The following examples describe specific embodiments of our invention and illustrate the best method contemplated for carrying it out; but they are not to be interpreted as limiting the invention to all details thereof, since changes can be made without departing from the scope or spirit of the invention. Parts and percentages are by weight and temperatures are in degrees centigrade.

The potassium acid phthalate is employed in the chemically pure form.

The monosodium-4-chlorophthalate is employed in the form of a technical product having the following approximate analysis, by weight:

| | Percent |
|---|---|
| Monosodium 4-chlorophthalate | 65 |
| Monosodium 3-chlorophthalate | 3 |
| Monosodium phthalate | 12 |
| Monosodium 3,4-dichlorophthalate | 5 |
| Monosodium 4,5-dichlorophthalate | 8 |

Balance essentially sodium chloride.

Example 1

*Part A.*—To a mixture of 215 parts of potassium acid phthalate and 900 parts of trichlorobenzene, 71.5 parts of "Sulfan" (stabilized liquid sulfur trioxide) is added slowly with stirring, and the resulting mixture is agitated for about 2 hours at ambient temperature. Thereafter 350 parts of urea, 31.9 parts of cuprous chloride and 0.5 part of ammonium molybdate are added and the mixture is then heated slowly with stirring to about 195° and then stirred at 195° to 200° for about 6 hours. The mixture is cooled to below 100° and filtered. The filter cake is washed with sufficient alcohol to remove residual trichlorobenzene, and extracted with aqueous alkali and then with aqueous acid as follows. The filter cake is slurried in about 1500 parts of water containing about 60 parts of sodium hydroxide. The alkaline slurry is boiled for about 2 hours with live steam. The slurry is then filtered, washed neutral with neutral hot water and then reslurried in about 1500 parts of water containing about 200 parts of 20° Bé. hydrochloric acid. This acid slurry is boiled for about one hour with live steam, and then filtered, and the filter cake is washed free of acid and soluble salts. The washed cake is dried at 80°. The dried product, copper phthalocyanine, weighs 140.3 parts, which represents a yield of 92.6% of the theoretical yield.

*Part B.*—Repetition of the process of part A of this example, but omitting the "Sulfan," results in a yield of only 46.9 parts of dried product. This is equivalent to only 31% of the theoretical yield.

Example 2

A mixture of 215 parts of potassium acid phthalate and 110 parts of 65% oleum in 900 parts of trichlorobenzene is agitated for about 2 hours at ambient temperature. Thereafter 350 parts of urea, 31.9 parts of cuprous chloride and 0.5 part of ammonium molybdate are added and the mixture is allowed to stand over night. Then the mixture is heated slowly to 195° and agitated at 195° to 200° for about 6 hours. The mixture is cooled to below 100°, and filtered. The filter cake is washed with alcohol and then extracted with aqueous alkali and then with aqueous acid, as described in Example 1, part A, washed, and dried in vacuum at 100°. The dried product weighs 140.7 parts, which represents a yield of 92.9% of the theoretical yield.

Example 3

*Part A.*—A mixture of 258 parts of the technical monosodium 4-chlorophthalate and 112 parts of 65% oleum in 1000 parts of trichlorobenzene is agitated for about 2 hours at ambient temperature. Thereafter 375 parts of urea, 32 parts of cuprous chloride and 0.5 part of ammonium molybdate are added. The mixture is heated slowly to 195° and agitated at 195° to 200° for about 6 hours. The mixture is cooled to below 100° and filtered. The filter cake is dried in vacuum to remove trichlorobenzene. The dried product is ground and then slurried in about 1500 parts of water containing about 60 parts of caustic soda. The alkaline slurry is boiled for about 2 hours with live steam. The slurry is then filtered, washed neutral with neutral hot water and then reslurried in about 1500 parts of water containing about 230 parts of 20° Bé. hydrochloric acid. The acid slurry is boiled for about one hour with live steam, and then filtered, and the filter cake is washed free of acid and soluble salts. The washed cake is dried at 80°. The dried product contains 18.92% chlorine, which is approximately the theoretical chlorine content for tetrachloro copper phthalocyanine. It weighs 192.5 parts, which represents a yield of 98% of the theoretical yield.

*Part B.*—Repetition of the process of part A of this example, but omitting the oleum and agitating the heated mixture at 195° to 200° for about 4 hours, results in a yield of only 79.2 parts of dried product. This is equivalent to only about 40% of the theoretical yield.

Example 4

The process of Example 3, part A, is repeated with the substitution of 129 parts of 100% sulfuric acid for the oleum. The dried product contains 19.72% chlorine, which is slightly above the theoretical content for tetrachloro copper phthalocyanine. It weighs 189.7 parts, which represents a yield of 96.3% of the theoretical yield.

Example 5

The process of Example 3, part A, is repeated with the substitution of 152.5 parts of chlorosulfonic acid for the oleum. The dried product weighs 188.6 parts, which represents a yield of 95.8% of the theoretical yield.

Example 6

*Part A.*—A mixture of 189.5 parts of the technical monosodium 4-chlorophthalate and 38.1 parts of phthalic anhydride is agitated with 87 parts of 65% oleum in about 1000 parts of trichlorobenzene in the manner described in Example 3, part A. Thereafter, by reaction with 330 parts of urea, 31.9 parts of cuprous chloride and 0.5 part of ammonium molybdate in the manner described in Example 3, part A, the mixture of phthalic acid compounds is converted to 176.6 parts or 97% of theory of trichloro copper phthalocyanine, containing 15.45% chlorine.

*Part B.*—Repetition of the process of part A of this example, but omitting the oleum, results in the production of only 113.5 parts (62.5% of theory) of the trichloro copper phthalocyanine.

Example 7

The procedure of Example 1, part A and Example 3, part A is followed, but without the final acid extraction, using 64.6 parts of the technical monosodium 4-chlorophthalate, 117 parts of phthalic anhydride, 21 parts of "Sulfan" (stabilized liquid sulfur-trioxide), 275 parts of urea, 29 parts of cuprous chloride and 0.45 part of ammonium molybdate. A yield of 155.0 parts of monochloro copper phthalocyanine (containing 5.77% chlorine) is obtained. This corresponds to 95% of the theoretical yield.

It can thus be seen that an efficient and readily operated process for the synthesis of metal containing phthalocyanines in improved yield and quality has been devised.

As will be readily apparent to those skilled in this art, many variations and modifications in the details of the above purely illustrative examples can be made without departing from the scope or spirit of our invention which is to be limited only as indicated in the patent claims.

We claim:

1. In a process for preparing a metal phthalocyanine by heating a reaction mixture containing a phthalocyanine intermediate, a nitrogen donor, a metal donor and a catalyst, the improvement which comprises incorporating sulfur trioxide in the reaction mixture in amount at least sufficient to improve the yield of metal phthalocyanine as compared with the yield obtained from the reaction mixture without the sulfur trioxide.

2. The process of claim 1 in which the amount of sulfur trioxide corresponds to at least one-half mol per mol of phthalocyanine intermediate.

3. The process of claim 2 in which the phthalocyanine intermediate is a mono-alkali metal salt of an o-phthalic acid.

4. The process of claim 2 in which the phthalocyanine intermediate is a mono-alkali metal salt of an o-phthalic acid selected from the group consisting of o-phthalic acid and halogenated o-phthalic acids.

5. The process of claim 2 in which the phthalocyanine intermediate comprises a mono-alkali metal salt of 4-chlorophthalic acid and the sulfur trioxide is employed in the form of liquid sulfur trioxide or oleum of at least 40% strength.

6. The process of claim 1 in which the sulfur trioxide is employed in the form of a member selected from the group consisting of oleum of at least 40% strength, liquid sulfur trioxide, 100% sulfuric acid and chlorosulfonic acid and in an amount to provide about two-thirds to one and one-quarter mols of sulfur trioxide per mol of phthalocyanine intermediate.

7. The process of claim 6 in which the phthalocyanine intermediate comprises a chlorinated phthalocyanine intermediate, the amount of sulfur trioxide corresponds to two-thirds to one and a quarter mols of sulfur trioxide per mol of chlorinated phthalocyanine intermediate, and the reaction medium comprises trichlorbenzene.

8. The process of claim 7 in which the chlorinated phthalocyanine intermediate is an alkali metal salt of 4-chlorophthalic acid.

9. The process of claim 7 in which the phthalocyanine intermediate is sodium mono-4-chlorophthalate.

10. The process which comprises heating a reaction mixture comprising about 1 mol of an alkali metal salt of mono-4-chlorophthalate, about 3 mols of phthalic anhydride, about two-thirds to one and a quarter mols of sulfur trioxide, a nitrogen donor, a metal donor, a phthalocyanine forming catalyst, and a high boiling non-reactive organic solvent, and separating metal-containing monochlorophthalocyanine from the resultant reaction mixture.

11. The process of claim 10 in which the metal donor is a copper compound, the organic solvent is trichlorobenzene and copper monocholorophthalocyanine is separated from the reaction mixture.

12. The process which comprises heating a reaction mixture comprising about 1 mol of a mono-alkali metal salt of phthalic acid, about two-thirds to about one and a quarter mol of sulfur trioxide, a nitrogen donor, a metal donor, a phthalocyanine forming catalyst, and a high boiling non-reactive organic solvent, and separating a metal phthalocyanine from the resultant reaction mixture.

13. The process of claim 11 in which the phthalic acid salt is potassium acid phthalate, the metal donor is cuprous chloride, the organic solvent is trichlorobenzene, and copper phthalocyanine is separated from the reaction mixture.

No references cited.

WALTER A. MODANCE, *Primary Examiner.*

JAMES A. PATTEN, *Assistant Examiner.*